(12) United States Patent
Zhang et al.

(10) Patent No.: US 11,499,830 B2
(45) Date of Patent: *Nov. 15, 2022

(54) SYSTEM AND METHOD FOR PROVIDING POINT OF INTEREST RELATED NOTIFICATIONS

(71) Applicant: Honda Motor Co., Ltd., Tokyo (JP)

(72) Inventors: Ting Zhang, Zhejiang (CN); Kiyotaka Kawashima, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,875

(22) Filed: Jun. 9, 2021

(65) Prior Publication Data
US 2021/0293545 A1   Sep. 23, 2021

Related U.S. Application Data

(63) Continuation of application No. 16/428,017, filed on May 31, 2019, now Pat. No. 11,156,462.

(51) Int. Cl.
  *G01C 21/20* (2006.01)
  *B60Q 9/00* (2006.01)
  *G07C 5/08* (2006.01)

(52) U.S. Cl.
  CPC .............. *G01C 21/20* (2013.01); *B60Q 9/00* (2013.01); *G07C 5/085* (2013.01)

(58) Field of Classification Search
  CPC ........... G01C 21/20; B60Q 9/00; G07C 5/085
  See application file for complete search history.

(56) References Cited

U.S. PATENT DOCUMENTS

| | | | |
|---|---|---|---|
| 6,924,750 B2 | 8/2005 | Flick | |
| 7,571,036 B2 | 8/2009 | Olsen et al. | |
| 8,738,277 B1 | 5/2014 | Kurosawa et al. | |
| 8,791,841 B2 | 7/2014 | Siris | |
| 9,615,231 B2 * | 4/2017 | Thiele | H04W 4/50 |
| 10,247,571 B2 | 4/2019 | Funakoshi et al. | |
| 2011/0224864 A1 * | 9/2011 | Gellatly | G01C 21/3679 701/29.5 |
| 2013/0282283 A1 * | 10/2013 | Bondesen | H04W 4/21 701/537 |

(Continued)

OTHER PUBLICATIONS

Notice of Allowance of U.S. Appl. No. 16/428,017 dated Jun. 29, 2021, 12 pages.

*Primary Examiner* — Haoshian Shih
(74) *Attorney, Agent, or Firm* — Rankin, Hill & Clark LLP

(57) ABSTRACT

A system and method for providing point of interest related notifications within a vehicle that include receiving sensor data associated with an opening of at least one vehicle window of the vehicle. The system and method also include storing a first geo-location of the vehicle based on the sensor data and determining if a subsequent geo-location of the vehicle is within a predetermined vicinity of at least one point of interest. The system and method further include providing at least one point of interest related notification associated with the at least one point of interest if it is determined that the subsequent geo-location of the vehicle is within the predetermined vicinity of the at least one point of interest.

18 Claims, 6 Drawing Sheets

(56) References Cited

U.S. PATENT DOCUMENTS

| | | |
|---|---|---|
| 2016/0189496 A1* | 6/2016 | Modi ............... G08B 13/08 340/545.2 |
| 2016/0292929 A1 | 10/2016 | Konks |
| 2019/0080313 A1 | 3/2019 | Van Wiemeersch |

* cited by examiner

SYSTEM AND METHOD FOR PROVIDING POINT OF INTEREST RELATED NOTIFICATIONS

CROSS-REFERENCE TO RELATED APPLICATION

This application is a continuation of, and claims priority to, U.S. application Ser. No. 16/428,017, filed on May 31, 2019, which is expressly incorporated herein by reference.

BACKGROUND

In many cases, individuals may utilize mobile device applications, internet websites, and/or rely of word of mouth to determine information that may pertain to one or more points of interest. Such information may include special events, discounts, coupons, suggestions, and the like that may pertain to retailers, restaurants, coffee shops, entertainment venues, and/or third party establishments. However, in many cases individuals using such means may not obtain such information in a timely and efficient manner. Such individuals may travel near the one or more points of interest without knowing that they may be missing out on opportunities to take advantage of such information at one or more respective points of interest.

BRIEF DESCRIPTION

According to one aspect, a computer-implemented method for providing point of interest related notifications within a vehicle that includes receiving sensor data associated with an opening of at least one vehicle window of the vehicle and storing a first geo-location of the vehicle based on the sensor data. At least one point of interest is determined to be located within a predetermined distance of the first geo-location of the vehicle. The computer-implemented method also includes determining if a subsequent geo-location of the vehicle is within a predetermined vicinity of the at least one point of interest. The computer-implemented method further includes providing at least one point of interest related notification associated with the at least one point of interest if it is determined that the subsequent geo-location of the vehicle is within the predetermined vicinity of the at least one point of interest.

According to another aspect, a system for providing point of interest related notifications within a vehicle that includes a memory storing instructions when executed by a processor cause the processor to receive sensor data associated with an opening of at least one vehicle window of the vehicle and store a first geo-location of the vehicle based on the sensor data. At least one point of interest is determined to be located within a predetermined distance of the first geo-location of the vehicle. The instructions also cause the processor to determine if a subsequent geo-location of the vehicle is within a predetermined vicinity of the at least one point of interest. The instructions further cause the processor to provide at least one point of interest related notification associated with the at least one point of interest if it is determined that the subsequent geo-location of the vehicle is within the predetermined vicinity of the at least one point of interest.

According to still another aspect, a non-transitory computer readable storage medium storing instructions that when executed by a computer, which includes a processor perform a method, the method includes receiving sensor data associated with an opening of at least one vehicle window of the vehicle and storing a first geo-location of the vehicle based on the sensor data. At least one point of interest is determined to be located within a predetermined distance of the first geo-location of the vehicle. The method also includes determining if a subsequent geo-location of the vehicle is within a predetermined vicinity of the at least one point of interest. The method further includes providing at least one point of interest related notification associated with the at least one point of interest if it is determined that the subsequent geo-location of the vehicle is within the predetermined vicinity of the at least one point of interest.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
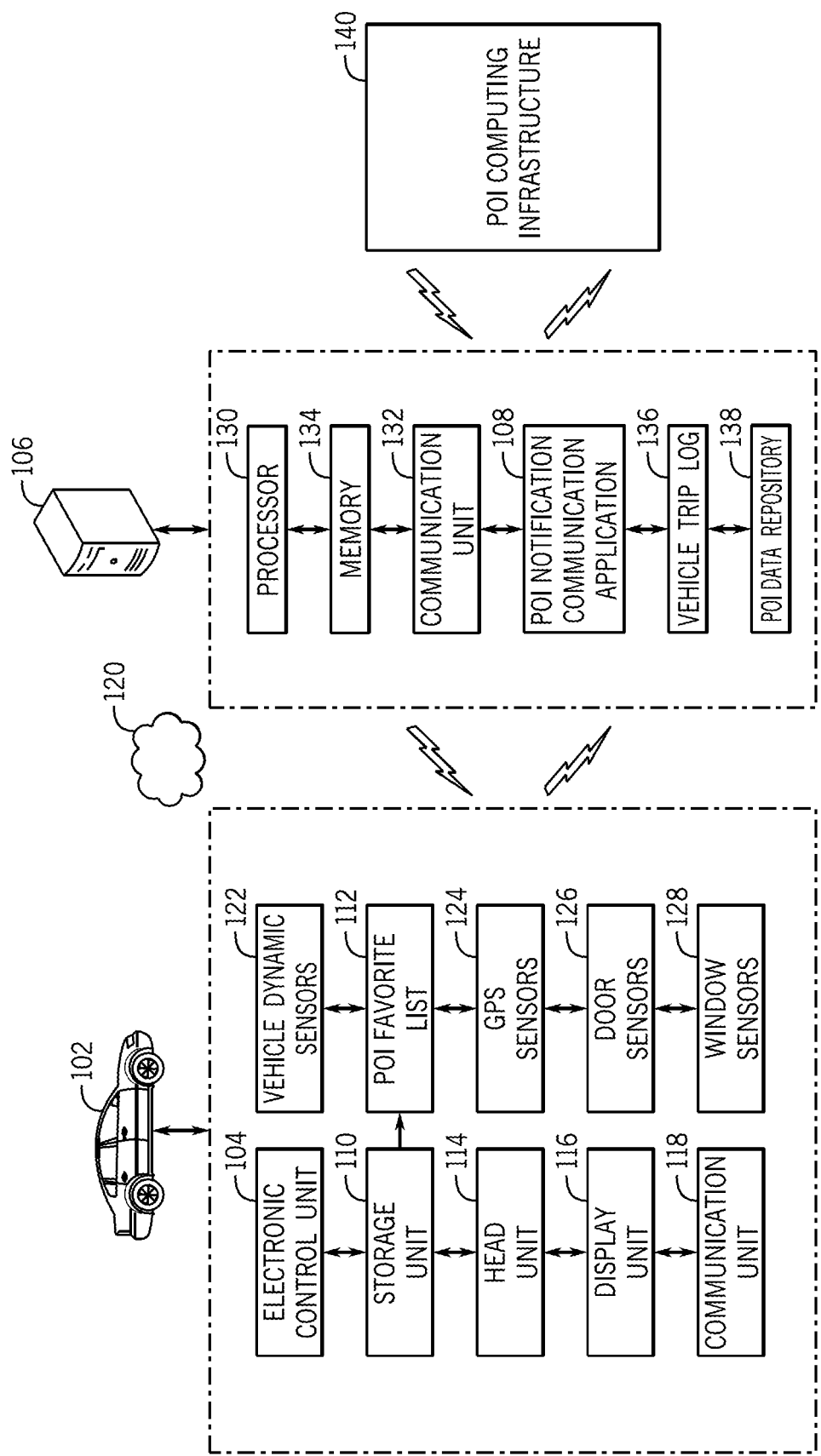
FIG. 1 is a schematic view of an exemplary operating environment for providing point of interest related notifications within a vehicle according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Referring now to the drawings, wherein the showings are for purposes of illustrating one or more exemplary embodiments and not for purposes of limiting the same, FIG. 1 is a schematic view of an exemplary operating environment 100 for providing point of interest related notifications within a vehicle 102 according to an exemplary embodiment of the present disclosure.

As shown, the operating environment 100 may include the vehicle 102 that may include a plurality of components that may be operably controlled by an electronic control unit 104. The vehicle 102 may be configured to communicate with an externally hosted computing infrastructure (external server) 106 that may be managed by a vehicle manufacturer (OEM) or a third-party entity (e.g., business, application developer). As discussed below, the ECU 104 and/or the external server 106 may be configured to execute a point of interest notification communication application (POI notification application) 108 that may be executed to provide point of interest related notifications within the vehicle 102.

In an exemplary embodiment, the POI notification application 108 may be configured to execute logic that may enable the application 108 to receive sensor data from one or more sensors of the vehicle 102 to determine if one or more triggering events take place. The one or more triggering events may be related to the operation of the vehicle 102 and/or the utilization of one or more components of the vehicle 102 and may be used to determine one or more instances in which a geo-location of the vehicle 102 should be retrieved from the vehicle 102 and stored on the external server 106.

As discussed below, the POI notification application 108 may be configured to analyze geo-location data that is retrieved and stored to determine if one or more points of interest that may be located within a predetermined distance (e.g., 1000 feet) of the retrieved geo-location of the vehicle 102. The POI notification application 108 may utilize such information to store data pertaining to points of interest that may be visited by one or more occupants (not shown) of the vehicle 102. This data may be further utilized during one or more subsequent trips of the vehicle 102. In particular, the POI notification application 108 may determine if the vehicle 102 is within a predetermined vicinity (e.g., within a 0.5 mile vicinity) of one or more stored points of interest based on one or more subsequent geo-locations of the vehicle 102. The POI notification application 108 may be configured to provide one or more point of interest related notifications to the one or more occupants of the vehicle 102 that may be associated with the data pertaining to the one or more stored points of interest that are in the predetermined vicinity of the vehicle 102.

The one or more point of interest related notifications may include, but may not be limited to, smart suggestions, event notifications, discount notifications, offer notifications, and/or additional notifications that may pertain to one or more particular points of interest. The POI notification application 108 may accordingly communicate one or more point of interest related notifications associated with one or more points of interest that are located within the predetermined vicinity of the traveling location of the vehicle 102 to thereby notify one or more occupants of the vehicle 102 of relevant information that may pertain to one or more nearby points of interest.

As an illustrative example, if the vehicle 102 stops at a drive thru window of a coffee shop, the application 108 may utilize a driver's side window of the vehicle 102 being opened at a geo-location that is within a predetermined distance of the coffee shop as a triggering event that may enable the application 108 to determine and store the geo-location of the vehicle 102. The application 108 may gather data regarding the coffee shop as a point of interest that is located within a predetermined distance of the captured geo-location of the vehicle 102. Accordingly, during one or more subsequent trips of the vehicle 102, if the vehicle 102 is determined to be located within a predetermined vicinity (e.g., 0.5 miles) of the coffee shop based on the previously stored geo-location of the vehicle 102, the application 108 may provide one or more point of interest related notifications to one or more occupants of the vehicle 102. Such point of interest related notifications may include coupons, offers, specials, events, and/or additional information that may pertain to the coffee shop.

With reference to the vehicle 102, as discussed, the components of the vehicle 102 may be operably controlled by the ECU 104 of the vehicle 102. The ECU 104 may be configured to execute one or more applications including but not limited to the POI notification application 108. The ECU 104 may also be configured to execute one or more operating systems, vehicle system and subsystem executable instructions, vehicle sensor logic, and the like. In one or more embodiments, the ECU 104 may include a microprocessor, one or more application-specific integrated circuit(s) (ASIC), or other similar devices.

The ECU 104 may also include respective internal processing memory, an interface circuit, and bus lines for transferring data, sending commands, and communicating with the plurality of components of the vehicle 102. In one or more configurations, the ECU 104 may include a respective communication device (not shown) for sending data internally to components of the vehicle 102 and communicating with externally hosted computing systems (not shown) (e.g., external to the vehicle 102). Generally, the ECU 104 may communicate with a storage unit 110 to execute one or more applications, operating systems, vehicle systems and subsystem user interfaces, and the like that are stored on the storage unit 110.

In one or more embodiments, the storage unit 110 may be configured to store a point of interest favorite list (POI favorite list) 112 that may be populated based on inputs that may be provided by one or more occupants of the vehicle 102. In particular, the POI favorite list 112 may be updated by the ECU 104 based on reception of an input by the occupant(s) (e.g., on a user interface) that a particular point of interest (e.g., school, restaurant, store, etc.) is to be stored as a favorite point of interest. The POI favorite list 112 may be utilized by a navigation system (not shown) of the vehicle 102 to quickly input the point(s) of interest as a destination in order to provide driving directions and/or traffic information related to a path of travel to the favorite point(s) of interest. In one embodiment, the application 108 may be configured to access and analyze the POI favorite list 112 to determine one or more favorite points of interest that may be frequently visited by the vehicle 102.

In an exemplary embodiment, the ECU 104 may also be operably connected to a head unit 114 of the vehicle 102. The head unit 114 may be configured to execute one or more application, application interfaces, and/or communicate with one or more components of the vehicle 102 to provide one or more interfaces to the one or more occupants within the vehicle 102. In one embodiment, the head unit 114 may operably control and may be operably connected to a display unit 116 within the vehicle 102.

The head unit 114 may operably control the display unit 116 to present one or more interfaces of the POI notification application 108 within the vehicle 102. In one embodiment, the display unit 116 may include a display screen (not shown) that may be positioned upon a center stack console (not shown) of the vehicle 102. However, in additional configurations, the display unit 116 may be configured as one or more display screens that may be alternatively or additionally in one or more formats, including, but not limited to, a dash board display, a seat back/cushion display, a pop-up display, a head-up display, a head-mounted display, and a portable device display.

In one embodiment, the one or more interfaces of the POI notification application 108 may include one or more application settings interfaces that may be presented to the occupant(s) of the vehicle 102 through the display unit. The one or more settings interfaces may enable the occupant(s) to enable and/or disable the presentation of POI related notifications within the vehicle 102. In some configurations, the one or more settings interfaces may enable the occupant(s) to increase or decrease a frequency, length, and/or number of POI related notifications that may be presented by the application 108 within the vehicle 102. In additional configurations, the one or more settings interfaces may enable the occupant(s) to mute (e.g., block) the presentation of one or more POI related notifications that pertain to one or more specific points of interest and/or one or more categories of points of interest.

In one embodiment, the one or more interfaces of the POI notification application 108 may also include one or more POI related notification interfaces that may also be presented to the occupant(s) of the vehicle 102 through the display unit 116. The one or more POI related notification interfaces may present one or more point of interest related notifications associated with one or more points of interest that are located within the predetermined vicinity of the traveling location of the vehicle 102. As discussed, the one or more point of interest related notifications may be provided within the vehicle 102 to notify one or more occupants of the vehicle 102 of relevant information that may pertain to one or more points of interest that are located within the predetermined vicinity of the vehicle 102. In some embodiments, the head unit 114 may utilize one or more vehicle systems, including but not limited to, an audio system, the navigation system, and/or a lighting system to provide additional visual or audio notifications that may correspond to the one or more point of interest related notifications being presented through the display unit 116. For example, the point of interest notifications may be displayed along with an audio readout of the notifications and/or with a promotional recording associated with a particular point of interest and/or category of point of interest.

In one or more embodiments, the one or more POI notification interfaces may additionally include one or more uniform resource locator (URL) links that may be selected by one or more occupants to access one or more websites, applications, and/or media (e.g., video, audio) that may be associated with a respective point(s) of interest. Accordingly, one or more occupants of the vehicle 102 may be presented with various levels of information that may pertain to one or more particular points of interest that are located within the predetermined vicinity of the traveling location of the vehicle 102 based on previous points of interest that the vehicle 102 may have previously visited. This functionality may ensure that the occupants may be provided with information that may be relevant to them with respect to one or more points of interest that may be of interest to them.

In an exemplary embodiment, the ECU 104 may additionally be operably connected to a communication unit 118 of the vehicle 102. The communication unit 118 may communicate with one or more components of the operating environment 100 and/or additional systems and components outside of the operating environment 100. The communication unit 118 may include, but is not limited to, one or more transceivers (not shown) of the vehicle 102 and additional components (not shown) that may be utilized for wired and wireless computer connections and communications via various protocols with one or more portable devices that may be carried by one or more occupants and may be within a (predetermined) communicable range with the communication unit 118 of the vehicle 102. For example, the communication unit 118 may be utilized for wired and wireless computer connections that may include an active computer connection with the portable device(s) that may be previously paired to the vehicle 102.

In one embodiment, the communication unit 118 may be configured to communicate with the external server 106 through an internet cloud 120. As discussed below, the communication unit 118 may be configured to send and receive data that may be analyzed, accessed, and/or stored by the POI notification application 108. For example, the communication unit 118 may be configured to send data pertaining to one or more geo-locations of the vehicle 102 to be stored on the external server 106 and utilized by the application 108.

In an exemplary embodiment, the ECU 104 may be operably connected to vehicle dynamic sensors 122 of the vehicle 102. In one embodiment, the vehicle dynamic sensors 122 may be configured to output vehicle dynamic data to the ECU 104, the POI notification application 108, one or more vehicle systems, sub-systems, control systems, and the like. The vehicle dynamic sensors 122 may include, but may not be limited to, speed sensors, brake force sensors, steering speed sensors, steering angle sensors, throttle angle sensors, accelerometers, magnetometers, gyroscopes, wheel speed sensors, wheel turning angle sensors, yaw rate sensors, transmission gear sensors, temperature sensors, RPM sensors, GPS/DGPS sensors, and the like (individual sensors not shown).

In one embodiment, the vehicle dynamic sensors 122 may be configured to output and communicate vehicle dynamic data that may pertain to a real-time speed of the vehicle 102. The POI notification application 108 may analyze the real-time speed to determine if the real-time speed is below, equal to, or above a predetermined speed threshold. The predetermined speed threshold may include a particular speed (e.g., 1 MPH) that may be utilized by the application 108 to determine that the vehicle 102 is slowing down and/or being stopped at a particular geo-location that is associated with at least one point of interest. In particular, the application 108 may evaluate additional data pertaining to the real-time speed of the vehicle 102 that may be utilized as a triggering event and may be used to determine one or more instances in which a geo-location of the vehicle 102 should be retrieved from the vehicle 102 and stored on the external server 106. In particular, this determination may be utilized by the application 108 to send data associated with the geo-location of the vehicle 102 to the external server 106. As discussed below, the geo-location of the vehicle 102 may be further utilized to provide one or more point of interest related notifications to the occupant(s) of the vehicle 102 when the vehicle 102 is subsequently determined to be within a predetermined vicinity of the point(s) of interest.

In one or more embodiments, the ECU 104 may additionally be configured to communicate with GPS sensors 124 of the vehicle 102. The GPS sensors 124 may be configured as global positioning sensors that may be configured to provide global positioning coordinates (GPS coordinates) and/or differential global positioning coordinates (DGPS coordinates) that may be analyzed by the ECU 104 and/or the application 108 to determine corresponding geo-locations of the vehicle 102. The geo-locations may include particular values that may be based on a geographic coordinate reference system. For example, in one embodiment, the geo-locations of the vehicle 102 may be included as values that may pertain to latitude and longitude based geographical coordinates that may be specified in decimal degrees.

As discussed in more detail below, the GPS sensors 124 may be configured to communicate a current geo-location of the vehicle 102 during each trip of the vehicle 102. The application 108 may utilize the current geo-location to determine if the vehicle 102 is located at or near one or more points of interest and may utilize such data to send the current geo-location information to the external server 106. The current geo-location information may be stored with associated point of interest related information and/or may be used to communicate one or more POI related notifications to the occupant(s) within the vehicle 102.

In an exemplary embodiment, the ECU 104 may be configured to communicate with door sensors 126 of the vehicle 102. The door sensors 126 may be disposed on doors (not shown) of the vehicle 102. In one embodiment, the door sensors 126 may be configured to communicate door sensing data to the ECU 104 and/or the application 108 that may pertain to a change in opening/closing status of a respective door of the vehicle 102. For example, if a driver's side door of the vehicle 102 is opened from a closed state, or closed from an opened state, the door sensors 126 disposed at or near the driver's side door may be configured to communicate respective door sensing data to the POI notification application 108.

In one configuration, the POI notification application 108 may utilize the door sensing data to determine a current geo-location of the vehicle 102 at one or more points in time. In particular, the application 108 may evaluate additional data pertaining to the opening of the door(s) of the vehicle 102 that may be utilized as a triggering event and may be used to determine one or more instances in which a geo-location of the vehicle 102 should be retrieved from the vehicle 102 and stored on the external server 106.

In one or more embodiments, the ECU 104 may be configured to communicate with window sensors 128 of the vehicle 102. The window sensors 128 may be disposed near windows (not shown) of the vehicle 102. In one embodiment, the window sensors 128 may be configured to communicate window sensing data to the ECU 104 and/or the application 108 that may pertain to a change in opening/closing status of a respective window of the vehicle 102. For example, if a driver's side window of the vehicle 102 is opened from a closed state, or closed from an opened state, the window sensors 128 disposed near the driver's side window may be configured to communicate respective window sensing data to the POI notification application 108.

In one configuration, the POI notification application 108 may utilize the window sensing data to determine a current geo-location of the vehicle 102 at one or more points in time. In particular, the application 108 may evaluate additional data pertaining to the opening of the window(s) of the vehicle 102 that may be utilized as a triggering event and may be used to determine one or more instances in which a geo-location of the vehicle 102 should be retrieved from the vehicle 102 and stored on the external server 106.

With particular reference to the external server 106, in an exemplary embodiment, the external server 106 may include a processor 130 that may operably control one or more components of the external server 106. In some configurations, the processor 130 may be configured to execute the POI notification application 108. The processor 130 may be operably connected to a communication unit 132 of the external server 106. The communication unit 132 may include one or more network interface cards (not shown) that may be configured to connect to one or more computing systems through the internet cloud 120 including, but not limited to, the ECU 104 of the vehicle 102. In one embodiment, the communication unit 132 may be configured to send and receive data through the internet cloud 120 with the communication unit 118 of the vehicle 102 to facilitate the collection of real-time geo-location information from the vehicle 102, to communicate point of interest related information to the vehicle 102, and/or to provide one or more POI related notifications to the occupant(s) within the vehicle 102.

In one configuration, the processor 130 may be operably connected to a memory 134 of the external server 106. The memory 134 may be configured to store data files associated with one or more applications, operating systems, vehicle systems, subsystem user interfaces, including but not limited to data files of the POI notification application 108. In particular, the memory 134 may be configured to store a vehicle trip log 136 that may be accessed and utilized by the POI notification application 108. In one embodiment, the vehicle trip log 136 may be configured as a relational database/data store that may include various records that may pertain to respective geo-locations that may be collected from the vehicle 102.

As discussed below, the application 108 may access the vehicle trip log 136 to update the vehicle trip log with current geo-location information that may pertain to a current geo-location of the vehicle 102. As discussed, the current geo-location information may be provided from the vehicle 102 to the external server 106 based on one or more triggering events that may take place that may be related to an operation of the vehicle 102 or a use of a component such as one or more doors or one or more windows of the vehicle 102. In one configuration, the current geo-location information may also include a time stamp that includes date and time values that pertain to the date and time that the vehicle 102 is located at the current geo-location(s).

In some configurations, the timestamp may be analyzed by the application 108 to determine one or more points of interest that may be frequently visited by the occupant(s) of the vehicle 102. Additionally, the application 108 may analyze one or more points of interest included within the POI favorite list 112 stored on the storage unit 110 of the vehicle 102. The application 108 may thereby prioritize one or more POI related notifications of one or more respective points of interest to be provided over other POI related notifications to ensure that the occupant(s) receive smart suggestions, event notifications, discount notifications, offer notifications, and/or additional notifications that may pertain to one or more particular points of interest that they prefer and/or frequent.

In an exemplary embodiment, the memory 134 may additionally store a POI data repository 138. The POI data repository 138 may include a particular data store that may be utilized by the application 108 to store point of interest related notification data that is updated based on communication with a POI computing infrastructure 140. The point of interest related notification data may include geo-location data that may pertain to one or more particular points of interest. Such data may be utilized to determine points of interest that are located at particular geo locations. The point of interest related notification data may additionally include suggestion data, event data, discount data, offer data, and/or additional notification data that may pertain to respective points of interest. In one embodiment, the POI data repository may be updated continually with updated point of interest related notification data that is provided by the POI computing infrastructure 140 and used by the application 108 to provide the one or more POI related notifications to the occupant(s) of the vehicle 102.

In one embodiment, the POI computing infrastructure 140 may include one or more computing devices (similar to the external server 106) that may communicate with one or more third party entities, that may include, but may not be limited to, retailors, restaurant operators, service providers, businesses, application developers/providers, and the like to receive data that may pertain to suggestions, events, discounts, offers, and/or additional relevant information (e.g., hours of operation, related events, company promotions, point of interest category related information) that may be provided to the POI computing infrastructure 140. This data may be provided to the POI computing infrastructure 140 to be stored and/or communicated to the external server 106 at one or more points in time. In particular, such data may be communicated by the POI computing infrastructure 140 to the external server 106 to be stored as point of interest notification data that may pertain to one or more points of interest that have been visited by the occupant(s) as stored within the vehicle trip log 136. In some configurations, such data may be communicated by the POI computing infrastructure 140 at particular points of time when one or more receive smart suggestion, events, discounts, offers, and/or additional notifications may be applicable. As discussed below, the POI notification application 108 may access the POI data repository 138 to retrieve the point of interest related notification data to thereby provide one or more POI related notifications to the occupant(s) of the vehicle 102 that are determined from the point of interest related notification data.

II. The Point of Interest Notification Communication Application and Related Methods The general functionality of the POI notification application 108 will now be discussed in more detail with respect to methods that may be executed by the application 108. In an exemplary embodiment, the POI notification application 108 may be fully or partially executed by the ECU 104 and/or the head unit 114 of the vehicle 102. Additionally or alternatively, the POI notification application 108 and one or more features and systems of the application 108, may be fully or partially executed by the processor 130 of the external server 106. The POI notification application 108 may utilize the communication unit 118 of the vehicle 102 and the communication unit 132 of the external server 106 to communicate application related data between one another through the internet cloud 120. Additionally, the POI notification application 108 may utilize the communication unit 132 of the external server 106 to communicate application related data through the internet cloud 120 between the external server 106 and the POI computing infrastructure 140.

Figure 2:
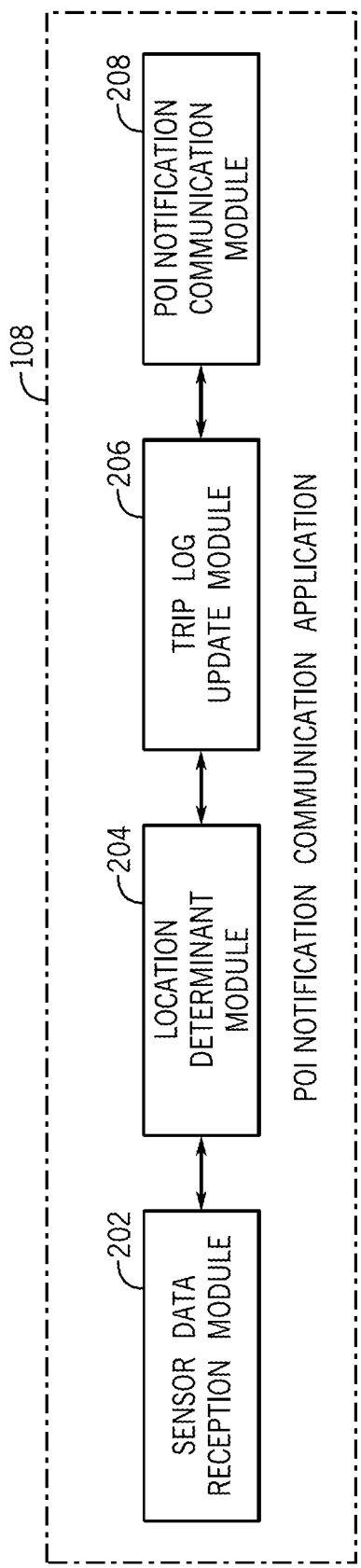
FIG. 2 is a schematic view of a plurality of modules of a point of interest notification communication application for providing point of interest related notifications associated with the at least one point of interest that is located within the predetermined vicinity of a location of the vehicle according to an exemplary embodiment of the present disclosure.

FIG. 2 is a schematic view of a plurality of modules 202-208 of the POI notification application 108 for providing point of interest related notifications associated with the at least one point of interest that is located within the predetermined vicinity of the location of the vehicle 102 according to an exemplary embodiment of the present disclosure. In an exemplary embodiment, the plurality of modules 202-208 may include a sensor data reception module 202, a location determinant module 204, a trip log update module 206, and a POI notification communication module 208. It is appreciated that the POI notification application 108 may include one or more additional modules and/or sub-modules that are included in addition or in lieu of the modules 202-208.

Figure 3:
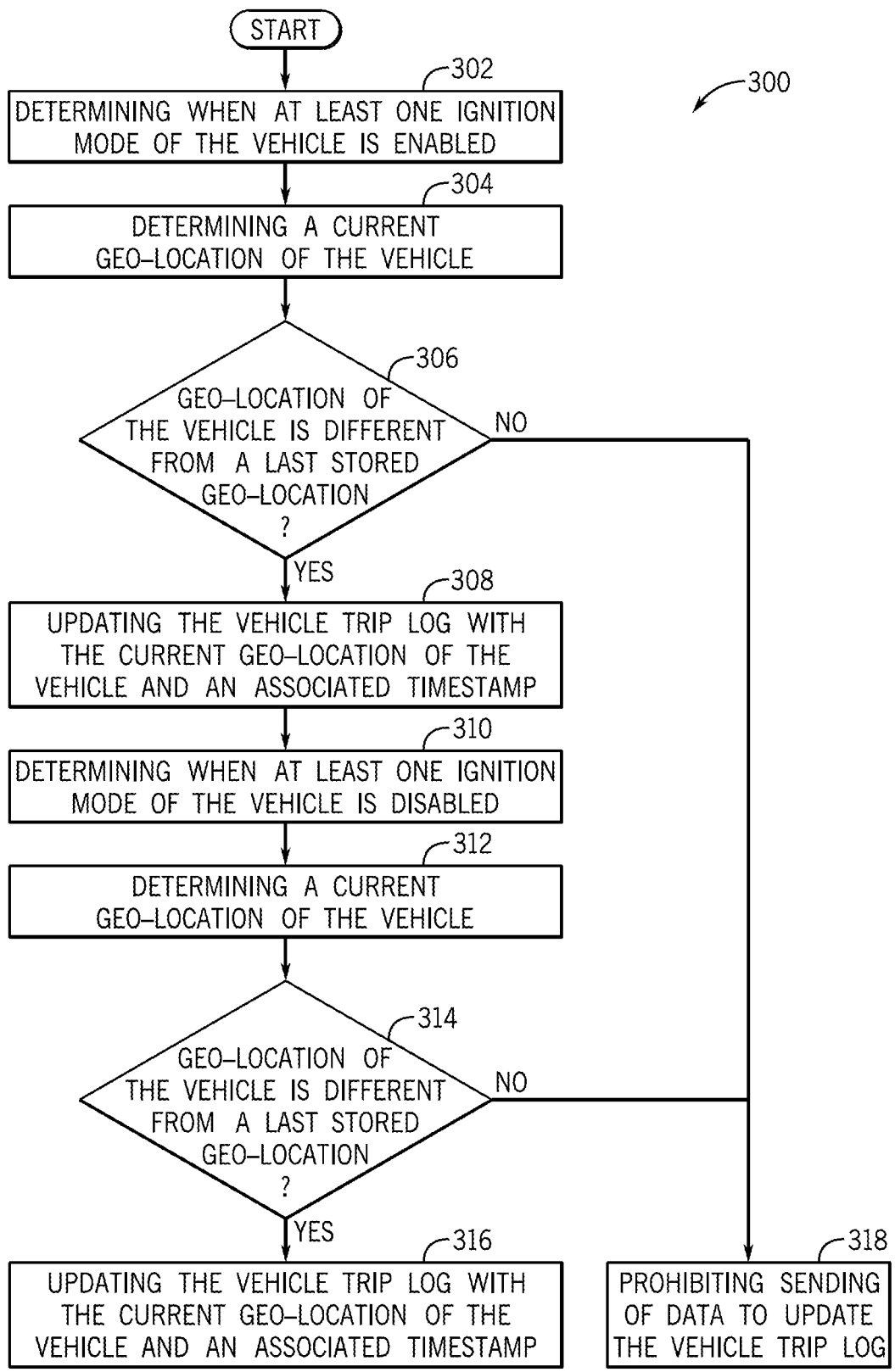
FIG. 3 is a process flow diagram of a method for storing a geo-location of the vehicle based on one or more ignition modes of the vehicle according to an exemplary embodiment of the present disclosure.

FIG. 3 is a process flow diagram of a method 300 for storing a geo-location of the vehicle 102 based on one or more ignition modes of the vehicle 102 according to an exemplary embodiment of the present disclosure. FIG. 3 will be described with reference to the components of FIG. 1 and FIG. 2, though it is to be appreciated that the method 300 of FIG. 3 may be used with additional and/or alternative system components. It is appreciated that the method 300 of FIG. 3 may be continually executed by the POI notification application 108 based on the enablement and/or disablement of one or more ignition modes of the vehicle 102.

The method 300 may begin at block 302, wherein the method 300 may include determining when at least one ignition mode of the vehicle 102 is enabled. In an exemplary embodiment, the sensor data reception module 202 of the POI notification application 108 may be configured to communicate with the ECU 104, the vehicle dynamic sensors 122, the GPS sensors 124, the door sensors 126, and/or the window sensors 128 of the vehicle 102 to receive respective data. Such data may be analyzed by the sensor data reception module 202 and/or communicated to one or more additional modules 204-208 of the application 108 to be further analyzed and/or processed.

In one embodiment, if one or more ignition modes of the vehicle 102 (e.g., battery powered mode, accessory mode, engine enablement mode) are enabled based on a driver manually enabling the ignition mode(s) (e.g., by inputting a push button) or the ECU 104 autonomously enabling the ignition mode(s), the ECU 104 may communicate respective data to the sensor data reception module 202. The sensor data reception module 202 may accordingly determine when at least one ignition mode of the vehicle 102 is enabled.

The method 300 may proceed to block 304, wherein the method 300 may include determining a current geo-location of the vehicle 102. In an exemplary embodiment, upon determining that at least one ignition mode of the vehicle 102 has been enabled, the sensor data reception module 202 may communicate with the GPS sensors 124 to determine GPS coordinates and/or DGPS coordinates of a current real-time geo-location of the vehicle 102. The GPS sensors 124 may thereby communicate the GPS coordinates and/or DGPS coordinates to the sensor data reception module 202. In one embodiment, the sensor data reception module 202 may communicate the GPS/DGPS coordinates of the vehicle 102 to the location determinant module 204.

In one embodiment, the location determinant module 204 of the POI notification application 108 may be configured to analyze GPS/DGPS coordinates of the vehicle 102 and determine the current geo-location of the vehicle 102. As discussed above, the current geo-location of the vehicle 102 may be included as values that may pertain to latitude and longitude based geographical coordinates that may be specified in decimal degrees. As discussed below, the location determinant module 204 may also be configured to communicate with the external server 106 to send and/or receive data pertaining to one or more current geo-locations and/or one or more past geo-locations of the vehicle 102.

The method 300 may proceed to block 306, wherein the method 300 may include determining if the geo-location of the vehicle 102 is different from a last stored geo-location. In one embodiment, each time the vehicle 102 is enabled, disabled, and/or one or more triggering events is determined to take place, the trip log update module 206 of the POI notification application 108 may be configured access the vehicle trip log 136 stored on the memory 134 of the external server 106 to store current geo-location information. The current geo-location information may also include a time stamp that includes date and time values that pertain to the date and time that the vehicle 102 is located at the current geo-location.

In one or more embodiments, upon determining the current geo-location of the vehicle 102, the location determinant module 204 may be configured to communicate with the external server 106 and may analyze the vehicle trip log 136 to determine a last stored geo-location of the vehicle 102 based on the time stamp of the current geo-location information that was last stored on the vehicle trip log 136. Accordingly, if the last stored geo-location of the vehicle 102 matches the current geo-location of the vehicle 102 (as determined at block 304), the location determinant module 204 may determine that the current geo-location of the vehicle 102 is not different than a last stored geo-location (at block 306).

The method 300 may accordingly proceed to block 316, wherein the method 300 may include prohibiting sending of data to update the vehicle trip log 136. In one embodiment, upon determining that the current geo-location of the vehicle 102 is the same as the last stored geo-location (at block 306), the location determinant module 204 may communicate corresponding data to the trip log update module 206. In one embodiment, the trip log update module 206 may thereby prohibit any communication of the current geo-location of the vehicle 102 between the communication unit 118 of the vehicle 102 and the communication unit 132 of the external server 106, thereby prohibiting the sending of data to update the vehicle trip log 136.

Referring again to block 306, upon analyzing the vehicle trip log 136 and determining a last stored geo-location of the vehicle 102 based on the time stamp of the current geo-location information that was last stored on the vehicle trip log 136, if the last stored geo-location of the vehicle 102 does not match the current geo-location of the vehicle 102 (as determined at block 304), the location determinant module 204 may determine that the geo-location of the vehicle 102 different than a last stored geo-location. The method 300 may thereby proceed to block 308, wherein the method 300 may include updating the vehicle trip log 136 with the current geo-location of the vehicle 102 and an associated timestamp. In one configuration, upon initially determining that the vehicle 102 is located at a geo-location (e.g., during an initial visit) and upon determining enablement or disablement of one or more ignition modes of the vehicle 102 and/or one or more triggering events, the application 108 may create a new record that pertains to the geo-location of the vehicle 102.

In an exemplary embodiment, upon determining that the current geo-location of the vehicle 102 is different from the last stored geo-location (at block 306), the location determinant module 204 may communicate corresponding data to the trip log update module 206. In one embodiment, the trip log update module 206 may utilize the communication unit 118 of the vehicle 102 to communicate the current geo-location of the vehicle 102 to the external server 106 through the communication unit 132. Accordingly, the trip log update module 206 may access the vehicle trip log 136 stored on the memory 134 of the external server 106 to query the vehicle trip log 136 to determine if a record pertaining to the current geo-location already exists (e.g., has been previously created) within the vehicle trip log 136 based on the vehicle 102 previously being located within the predetermined vicinity of the geo-location.

If it is determined that the record pertaining to the current geo-location already exists, the trip log update module 206 may update the record with a current time stamp that may be stored in addition to past time stamps during which the vehicle 102 was/is located at the current geo-location. Alternatively, if the trip log update module 206 determines that a record pertaining to the current geo-location does not exist, the trip log update module 206 may create a new record that pertains to the current geo-location of the vehicle 102. The new record may additionally be updated with the time stamp associated with the current date and time that the vehicle 102 is located at the current geo-location. It is appreciated that the trip log update module 206 may accordingly update the newly created record pertaining to the current geo-location each time the vehicle 102 is determined to be located within the predetermined distance of the geo-location at a future point in time based on the determination of enablement or disablement of one or more ignition modes of the vehicle 102 and/or that one or more triggering events occurs.

The method 300 may proceed to block 310, wherein the method 300 may include determining when at least one ignition mode of the vehicle 102 is disabled. In one embodiment, if one or more ignition modes of the vehicle 102 are disabled based on the driver manually disabling the ignition mode(s) (e.g., by inputting a push button) or the ECU 104 autonomously disabling the ignition mode(s), the ECU 104 may communicate respective data to the sensor data reception module 202. The sensor data reception module 202 may accordingly determine when at least one ignition mode of the vehicle 102 is disabled.

The method 300 may proceed to block 312, wherein the method 300 may include determining a current geo-location of the vehicle 102. In an exemplary embodiment, upon determining that at least one ignition mode of the vehicle 102 has been disabled, the sensor data reception module 202 may communicate with the GPS sensors 124 to determine GPS coordinates and/or DGPS coordinates of a current real-time geo-location of the vehicle 102. The GPS sensors 124 may thereby communicate the GPS coordinates and/or DGPS coordinates to the sensor data reception module 202. In one embodiment, the sensor data reception module 202 may communicate the GPS/DGPS coordinates of the vehicle 102 to the location determinant module 204. In one embodiment, the location determinant module 204 of the POI notification application 108 may be configured to analyze the GPS/DGPS coordinates of the vehicle 102 and determine the current geo-location of the vehicle 102.

The method 300 may proceed to block 314, wherein the method 300 may include determining if the geo-location of the vehicle 102 is different from a last stored geo-location. In one or more embodiments, upon determining the current geo-location of the vehicle 102, the location determinant module 204 may be configured to communicate with the external server 106 and may analyze the vehicle trip log 136 to determine a last stored geo-location of the vehicle 102 based on the time stamp of the real-time geo-location information that was last stored on the vehicle trip log 136. Accordingly, if the last stored geo-location of the vehicle 102 matches the current geo-location of the vehicle 102 (as determined at block 312), the location determinant module 204 may determine that the geo-location of the vehicle 102 is not different than a last stored geo-location (at block 314). The method 300 may accordingly proceed to block 316, wherein the method 300 may include prohibiting sending of data to update the vehicle trip log 136, as discussed in detail above.

Upon analyzing the vehicle trip log 136 and determining a last stored geo-location of the vehicle 102 based on the time stamp of the real-time geo-location information that was last stored on the vehicle trip log 136, if the last stored geo-location of the vehicle 102 does not match the current geo-location of the vehicle 102 (as determined at block 314), the location determinant module 204 may determine that the geo-location of the vehicle 102 different than a last stored geo-location. The method 300 may thereby proceed to block 318, wherein the method 300 may updating the vehicle trip log 136 with the current geo-location of the vehicle 102 and an associated timestamp.

In an exemplary embodiment, upon determining that the current geo-location of the vehicle 102 is different from the last stored geo-location (at block 314), the location determinant module 204 may communicate corresponding data to the trip log update module 206. In one embodiment, the trip log update module 206 may utilize the communication unit 118 of the vehicle 102 to communicate the current geo-location of the vehicle 102 to the external server 106 through the communication unit 132. Accordingly, the trip log update module 206 may access the vehicle trip log 136 stored on the memory 134 of the external server 106 to query the vehicle trip log 136 to determine if a record pertaining to the current geo-location already exists (e.g., has been previously created) within the vehicle trip log 136.

If it is determined that the record pertaining to the current geo-location already exists, the trip log update module 206 may update the record with a current time stamp that may be stored in addition to past time stamps during which the vehicle 102 was/is located at the current geo-location. Alternatively, if the trip log update module 206 determines that a record pertaining to the current geo-location does not exist, the trip log update module 206 may create a new record that pertains to the current geo-location of the vehicle 102.

Figure 4:
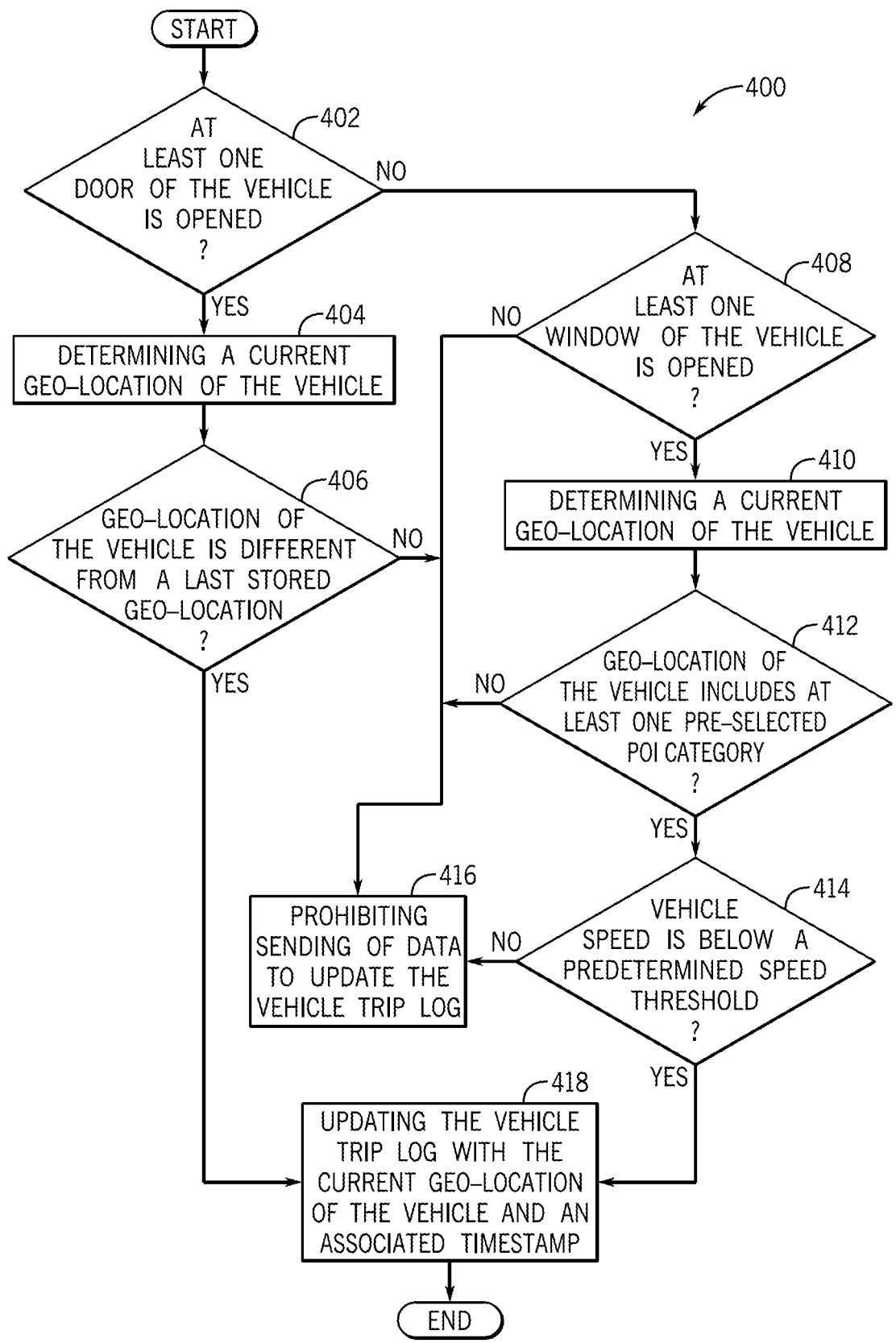
FIG. 4 is a process flow diagram of a method for storing a geo-location of the vehicle based on one or more triggering events occurring according to an exemplary embodiment of the present disclosure.

FIG. 4 is a process flow diagram of a method 400 for storing a geo-location of the vehicle 102 based on one or more triggering events occurring according to an exemplary embodiment of the present disclosure. FIG. 4 will be described with reference to the components of FIG. 1 and FIG. 2, though it is to be appreciated that the method 400 of FIG. 4 may be used with additional and/or alternative system components. It is appreciated that the method 400 of FIG. 4 may be continually executed by POI notification application 108 during enablement or disablement of one or more ignition modes of the vehicle 102.

The method 400 may begin at block 402, wherein the method 400 may include determining if at least one door of the vehicle 102 is opened. In an exemplary embodiment, the sensor data reception module 202 may be configured to communicate with the door sensors 126 to determine if one or more doors of the vehicle 102 are opened from a closed state. In one configuration, upon the opening or closing of one or more particular doors of the vehicle 102, the door sensors 126 may communicate respective data to the sensor data reception module 202.

In one configuration, the sensor data reception module 202 may thereby classify one or more doors of the vehicle 102 being opened as a triggering event and may thereby communicate respective data to the location determinant module 204. In alternate configurations, the sensor data reception module 202 may classify a particular door being opened, such as a driver side door being opened, as a triggering event and may communicate respective data to the location determinant module 204.

If the triggering event is classified by the sensor data reception module 202 based on determining that at least one door of the vehicle 102 is opened (at block 402), the method 400 may proceed to block 404, wherein the method 400 may include determining a current geo-location of the vehicle 102. In an exemplary embodiment, upon at least one door of the vehicle 102 being determined to be opened, the sensor data reception module 202 may communicate with the GPS sensors 124 to determine GPS coordinates and/or DGPS coordinates of a current geo-location of the vehicle 102. The GPS sensors 124 may thereby communicate the GPS coordinates and/or DGPS coordinates to the sensor data reception module 202. In one embodiment, the sensor data reception module 202 may communicate the GPS/DGPS coordinates of the vehicle 102 to the location determinant module 204. In one embodiment, the location determinant module 204 of the POI notification application 108 may be configured to analyze GPS/DGPS coordinates of the vehicle 102 and determine the current geo-location of the vehicle 102.

The method 400 may proceed to block 406, wherein the method 400 may include determining if a geo-location of the vehicle 102 is different from a last stored geo-location. In one or more embodiments, upon determining the current geo-location of the vehicle 102, the location determinant module 204 may be configured to communicate with the external server 106 and may analyze the vehicle trip log 136 to determine a last stored geo-location of the vehicle 102 based on the time stamp of the real-time geo-location information that was last stored on the vehicle trip log 136. Accordingly, if the last stored geo-location of the vehicle 102 matches the current geo-location of the vehicle 102 (as determined at block 404), the location determinant module 204 may determine that the geo-location of the vehicle 102 is not different than a last stored geo-location (at block 406). The method 400 may accordingly proceed to block 416, wherein the method 400 may include prohibiting sending of data to update the vehicle trip log 136.

In one embodiment, upon determining that the current geo-location of the vehicle 102 is the same as the last stored geo-location (at block 406), the location determinant module 204 may communicate corresponding data to the trip log update module 206. In one embodiment, the trip log update module 206 may thereby prohibit any communication of the current geo-location of the vehicle 102 between the communication unit 118 of the vehicle 102 and the communication unit 132 of the external server 106, thereby prohibiting the sending of data to update the vehicle trip log 136.

Referring again to block 406, upon analyzing the vehicle trip log 136 and determining a last stored geo-location of the vehicle 102 based on the time stamp of the real-time geo-location information that was last stored on the vehicle trip log 136, if the last stored geo-location of the vehicle 102 does not match the current geo-location of the vehicle 102 (as determined at block 404), the location determinant module 204 may determine that the geo-location of the vehicle 102 different than a last stored geo-location. The method 400 may thereby proceed to block 418, wherein the method 400 may include updating the vehicle trip log 136 with the current geo-location of the vehicle 102 and an associated timestamp.

In an exemplary embodiment, upon determining that the current geo-location of the vehicle 102 is different from the last stored geo-location (at block 306), the location determinant module 204 may communicate corresponding data to the trip log update module 206. In one embodiment, the trip log update module 206 may utilize the communication unit 118 of the vehicle 102 to communicate the current geo-location of the vehicle 102 to the external server 106 through the communication unit 132. Accordingly, the trip log update module 206 may access the vehicle trip log 136 stored on the memory 134 of the external server 106 to query the vehicle trip log 136 to determine if a record pertaining to the current geo-location already exists (e.g., has been previously created) within the vehicle trip log 136.

If it is determined that the record pertaining to the current geo-location already exists, the trip log update module 206 may update the record with a current time stamp that may be stored in addition to past time stamps during which the vehicle 102 was/is located at the current geo-location. Alternatively, if the trip log update module 206 determines that a record pertaining to the current geo-location does not exist, the trip log update module 206 may create a new record that pertains to the current geo-location of the vehicle 102.

Referring again to block 402, if it is determined that at least one door of the vehicle 102 is not opened, the method 400 may proceed to block 408, wherein the method 400 may include determining if at least one window of the vehicle 102 is opened. In an exemplary embodiment, the sensor data reception module 202 may be configured to communicate with the window sensors 128 to determine if one or more windows of the vehicle 102 are opened from a closed state. In one configuration, upon the opening or closing of one or more particular widows of the vehicle 102, the window sensors 128 may communicate respective data to the sensor data reception module 202.

In one configuration, the sensor data reception module 202 may thereby classify one or more windows of the vehicle 102 being opened as a triggering event and may thereby communicate respective data to the location determinant module 204. In alternate configurations, the sensor data reception module 202 may classify a particular window being opened, such as a driver side window being opened, as a triggering event and may communicate respective data to the location determinant module 204.

If the triggering event is classified by the sensor data reception module 202 based on determining that at least one window of the vehicle 102 is opened (at block 408), the method 400 may proceed to block 410, wherein the method 400 may include determining a current geo-location of the vehicle 102. In an exemplary embodiment, upon determining that at least one window of the vehicle 102 is opened, the sensor data reception module 202 may communicate with the GPS sensors 124 to determine GPS coordinates and/or DGPS coordinates of a current geo-location of the vehicle 102. The GPS sensors 124 may thereby communicate the GPS coordinates and/or DGPS coordinates to the sensor data reception module 202. In one embodiment, the sensor data reception module 202 may communicate the GPS/DGPS coordinates of the vehicle 102 to the location determinant module 204. In one embodiment, the location determinant module 204 of the POI notification application 108 may be configured to analyze GPS/DGPS coordinates of the vehicle 102 and determine the current geo-location of the vehicle 102.

The method 400 may proceed to block 412, wherein the method 400 may include determining if the geo-location of the vehicle 102 includes at least one pre-selected POI category. As discussed above, the POI notification application 108 may determine one or more selected POI categories that may be determined based on one or more categories of points of interest that may be included within the POI favorite list 112 stored on the storage unit 110 of the vehicle 102. In an additional embodiment, the POI notification application 108 may determine one or more selected POI categories that may be determined based on one or more categories of points of interest that may be frequently visited by the occupant(s) of the vehicle 102, based on analysis of timestamps that are associated with the points of interest stored upon the vehicle trip log 136.

The categories may include, but may not be limited to, particular types of retailers, restaurants, service providers, businesses, application developers/providers. For example, the categories may include pizza restaurants, coffee shops, car washes, whole sale retailers, etc. that may be determined based on one or more categories of points of interest that may be included within the POI favorite list 112 and/or one or more categories of points of interest that may be frequently visited by the occupants of the vehicle 102 (as determined based on the geo-location(s) of the vehicle 102).

In one or more embodiments, as discussed above, the application 108 may store point of interest related notification data that is updated based on communication with a POI computing infrastructure 140. The point of interest related notification data may include geo-location data that may pertain to one or more particular points of interest. In one embodiment, upon determining the current geo-location of the vehicle 102 (at block 410), the location determinant module 204 may be configured to communicate with the external server 106 to access the POI data repository 138 stored on the memory 134. The location determinant module 204 may thereby determine one or more points of interest that are located at the current geo-location of the vehicle 102. In particular, the location determinant module 204 may determine one or more respective point of interest names (e.g., name of coffee shop), one or more point of interest categories, and point of interest related information associated with the current geo-location of the vehicle 102.

In one embodiment, upon determining the one or more categories of one or more respective points of interest located at the current geo-location of the vehicle 102, the location determinant module 204 may determine if the geo-location of the vehicle 102 includes at least one pre-selected POI categories, as determined by the application 108 based on one or more categories of points of interest that may be frequently visited by the occupant(s) of the vehicle 102, based on analysis of timestamps that are associated with the points of interest stored upon the vehicle trip log 136.

If it is determined that the geo-location of the vehicle 102 does not include at least one pre-selected POI category (at block 412), the method 400 may proceed to block 416, wherein the method 400 may include prohibiting sending of data to update the vehicle trip log 136, as discussed in detail above. Alternatively, if it is determined that the geo-location of the vehicle 102 includes at least one pre-selected POI category (at block 412), the method 400 may proceed to block 414, wherein the method 400 may include determining if the vehicle speed is below a predetermined speed threshold.

In an exemplary embodiment, the sensor data reception module 202 may be configured to communicate with the vehicle dynamic sensors 122 to determine a real-time speed of the vehicle 102. In one configuration, the vehicle dynamic sensors 122 may be configured to provide the real-time speed as a value to the sensor data reception module 202 upon the module 202 communicating with the vehicle dynamic sensors 122 to determine the real-time speed. In an alternate embodiment, the vehicle dynamic sensors 122 may communicate the real time-speed as a value to the sensor data reception module 202 upon the vehicle dynamic sensors 122 determining that brakes of the vehicle 102 are utilized to slow the vehicle 102 down and/or a steering angle of the steering of the vehicle 102 indicates that the vehicle 102 is being turned by a predetermined amount (e.g., turning onto another street, drive thru, parking lot).

In one embodiment, upon receiving the real-time speed of the vehicle 102, the sensor data reception module 202 may compare the real-time speed to the predetermined speed threshold implemented by the application 108. As discussed above, the predetermined speed threshold may include a particular speed (e.g., 1 MPH) that may be utilized by the application 108 to determine that the vehicle 102 is slowing down and/or being stopped at a particular geo-location. Based on the comparison of the real-time speed against the predetermined speed threshold, the sensor data reception module 202 may determine if the vehicle speed is below the predetermined speed threshold.

In one configuration, if the sensor data reception module 202 determines that the vehicle speed is below the predetermined speed threshold implemented by the application 108, the sensor data reception module 202 may thereby classify the reduction in vehicle speed as a triggering event and may communicate respective data to the location determinant module 204. If the triggering event classified by the sensor data reception module 202 is determined to occur based on determining that that the vehicle speed is below the predetermined speed threshold implemented by the application 108 (at block 414), the method 400 may proceed to block 418, wherein the method 400 may updating the vehicle trip log 136 with the current geo-location of the vehicle 102 and an associated timestamp, as discussed above in more detail.

Alternatively, if the triggering event is not determined to occur by the sensor data reception module 202 based on determining that that the vehicle speed meets or is above the predetermined speed threshold implemented by the application 108 (at block 414), the method 400 may proceed to block 416, wherein the method 400 may include prohibiting sending of data to update the vehicle trip log 136, as discussed in more detail above. It is to be appreciated that the method 300 of FIG. 3 and the method 400 FIG. 4 may be continually and contemporaneously executed by the POI notification application 108 to ensure that one or more points of interest that may be located within a predetermined distance of a current geo-location of the vehicle 102 are possibly stored based on the enablement of one or more ignition modes of the vehicle 102, the disablement of one or more ignition modes of the vehicle 102, and/or the occurrence of one or more triggering events as determined by the POI notification application 108.

Figure 5:
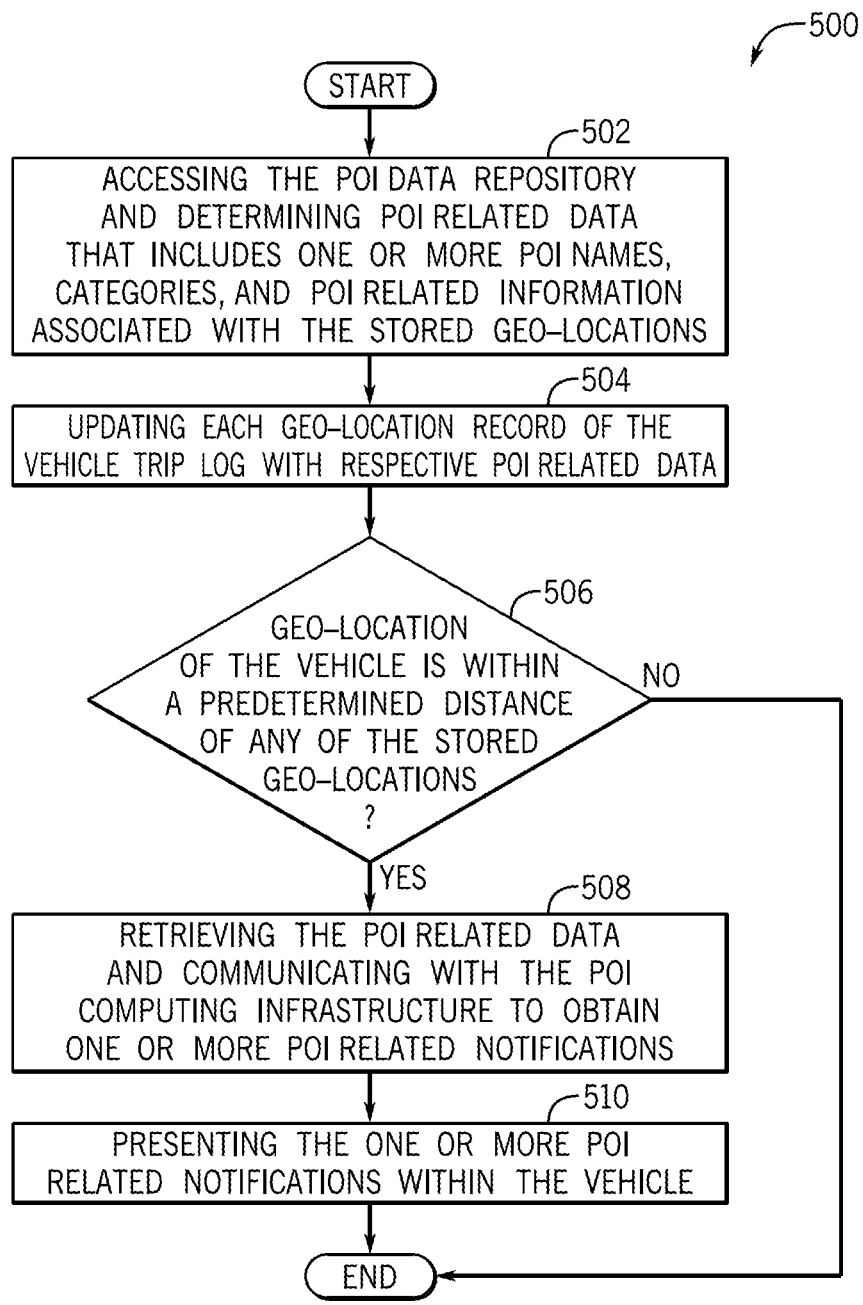
FIG. 5 is a process flow diagram of a method for providing one or more point of interest notifications to be presented within the vehicle according to an exemplary embodiment of the present disclosure.

FIG. 5 is a process flow diagram of a method 500 for providing one or more point of interest notifications to be presented within the vehicle 102 according to an exemplary embodiment of the present disclosure. FIG. 5 will be described with reference to the components of FIG. 1 and FIG. 2, though it is to be appreciated that the method 500 of FIG. 5 may be used with additional and/or alternative system components. It is appreciated that the method 500 of FIG. 5 may be continually executed by POI notification application 108 during enablement or disablement of one or more ignition modes of the vehicle 102.

The method 500 may begin at block 502, wherein the method 500 may include accessing the POI data repository 138 and determining POI related data associated with one or more geo-locations updated within the vehicle trip log 136. In an exemplary embodiment, upon updating the vehicle trip log 136 with the current geo-location of the vehicle 102 (at blocks 308, 318 of the method 300 of FIG. 3 and/or block 418 of the method 400 of FIG. 4), the trip log update module 206 may send data pertaining to the current geo-location of the vehicle 102 to the POI notification communication module 208. The POI notification communication module 208 of the application 108 may be configured to determine data that may pertain to one or more points of interest and related point of interest notification data that may pertain to one or more points of interest that are located within a predetermined distance of the current geo-location of the vehicle 102.

In one embodiment, the POI notification communication module 208 may communicate with the external server 106 and analyze the POI data repository 138 with respect to the current geo-location(s) of the vehicle 102 stored on the vehicle trip log 136. In particular, the POI notification communication module 208 may analyze the POI data repository 138 to determine POI related data that includes point of interest names, point of interest categories, and/or additional point of interest related information that may be associated with one or more geo-locations as stored by the trip log update module 206.

The method 500 may proceed to block 504, wherein the method 500 may include updating each geo-location record of the vehicle trip log 136 with respective POI related data. In one configuration, upon determining the POI related data associated with one or more geo-locations (at block 502), the POI notification communication module 208 may access the vehicle trip log 136 and update one or more respective records of the vehicle trip log 136 with POI related data that may be associated to one or more points of interest that are located within a predetermined distance of the respective geo-location(s). Accordingly, one or more records of the vehicle trip log 136 that have been updated with the current geo-location of the vehicle 102 (at blocks 308, 318 of the method 300 of FIG. 3 and/or block 418 of the method 400 of FIG. 4), may be further updated or re-updated with POI related data that may be associated with one or more points of interest that are located within a predetermined distance of the current geo-location of the vehicle 102. In particular, the one or more records may be updated with point of interest names, point of interest categories, and/or additional point of interest related information that may be associated with the current geo-location of the vehicle 102.

The method 500 may proceed to block 506, wherein the method 500 may include determining if a geo-location of the vehicle 102 is within a predetermined vicinity of any of the stored geo-locations. In an exemplary embodiment, the POI notification communication module 208 may communicate with the sensor data reception module 202 to determine when one or more ignition modes of the vehicle 102 are disabled and/or enabled to determine when the vehicle 102 may be utilized for a new trip. The new trip may be determined as a subsequent usage of the vehicle 102 that occurs after the vehicle trip log 136 is updated with the current geo-location of the vehicle 102 and respective POI related data by the application 108. As discussed above, the sensor data reception module 202 may be configured to communicate with the ECU 104 to determine when the vehicle 102 is enabled and/or disabled. The sensor data reception module 202 may accordingly communicate respective data regarding enablement and/or disablement of one or more ignition modes of the vehicle 102 to the POI notification communication module 208.

In one or more embodiments, upon determining enablement and/or disablement of one or more ignition modes of the vehicle 102, the POI notification communication module 208 may communicate with the location determinant module 204 to determine the current geo-location of the vehicle 102. In some embodiments, this determination may take place at one or more time intervals (e.g., every five minutes) and/or one or more distance intervals (e.g., every three miles). As discussed above, the location determinant module 204 may be configured to analyze GPS/DGPS coordinates of the vehicle 102 as communicated by the GPS sensors 124 and determine the current geo-location of the vehicle 102.

Upon determining the current geo-location of the vehicle 102, the POI notification communication module 208 may access the vehicle trip log 136 and may query the vehicle trip log 136 for one or more records that include one or more previously stored geo-locations (as previously stored by the trip log update module 206). If one or more records are found that include previous geo-locations of the vehicle 102 that are located within a predetermined vicinity of the current geo-location of the vehicle 102, the POI notification communication module 208 may thereby retrieve associated POI related data from the respective records. Such data may include point of interest names, point of interest categories, and additional point of interest related information.

If it is determined that the geo-location of the vehicle 102 is within a predetermined vicinity of any of the stored geo-location(s) (at block 506), the method 500 may proceed to block 508, wherein the method 500 may include retrieving point of interest related notification data pertaining to one or more points of interest located within a predetermined distance of the current geo-location of the vehicle 102.

As discussed above, the POI data repository 138 may include a particular data store that may be utilized by the application 108 to store point of interest related notification data that is updated based on communication with a POI computing infrastructure 140. The point of interest related notification data may additionally include suggestion data, event data, discount data, offer data, and/or additional notification data that may pertain to respective points of interest. As discussed above, if one or more records are found that include previous geo-locations of the vehicle 102 that are located within a predetermined vicinity of the current geo-location of the vehicle 102, the POI notification communication module 208 may retrieve associated POI related data from the respective records.

In one embodiment, the POI notification communication module 208 may query the POI data repository 138 for point of interest names and/or point of interest categories that match with the point of interest names and/or point of interest categories included within the associated POI related data retrieved from the respective records of the vehicle trip log 136. The POI notification communication module 208 may accordingly retrieve point of interest related notification data that may be associated with one or more points of interest that were previously visited by the vehicle 102 and are located within a predetermined distance of a current geo-location of the vehicle 102. As discussed, the point of interest related notification data may include suggestion data, event data, discount data, offer data, and/or additional notification data that may pertain to respective points of interest.

The method 500 may proceed to block 510, wherein the method 500 may include presenting the one or more POI related notifications within the vehicle 102. In an exemplary embodiment, upon retrieving point of interest related notification data that may be associated with one or more points of interest that were previously visited by the vehicle 102 and are located within a predetermined distance of a current geo-location of the vehicle 102, the POI notification communication module 208 may be configured to communicate with the ECU 104 of the vehicle 102 to present the one or more POI related notifications. In one embodiment, the ECU 104 may operably control the display unit 116 to present one or more POI related notification interfaces that may include one or more point of interest related notifications associated with one or more points of interest that are located within the predetermined vicinity of the location of the vehicle 102. The one or more point of interest related notifications may be provided within the vehicle 102 to notify one or more occupants of the vehicle 102 of relevant information that may pertain to one or more points of interest that are located within the predetermined vicinity of the vehicle 102. As discussed, in some embodiments, the head unit 114 may utilize one or more vehicle systems, including but not limited to, an audio system, the navigation system, and/or a lighting system to provide additional visual or audio notifications that may correspond to the one or more point of interest related notifications being presented through the display unit 116. In one embodiment, the point of interest related notifications may include a close input button that may be inputted by the occupant to cease presentation of the point of interest related notifications. In additional embodiments, the presentation of the point of interest related notifications may be ceased based on one or more voice commands that may be accepted by the head unit 114.

Figure 6:
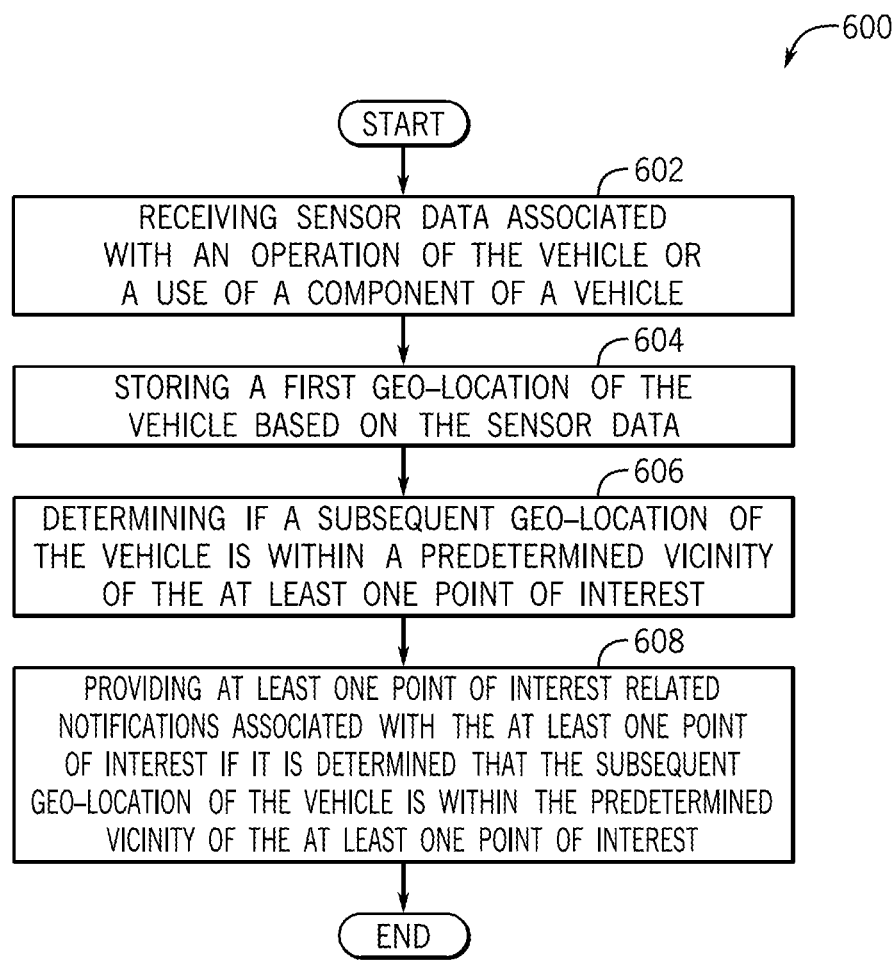
FIG. 6 is a process flow diagram of a method for providing point of interest related notifications within a vehicle according to an exemplary embodiment of the present disclosure.

FIG. 6 is a process flow diagram of a method 600 for providing point of interest related notifications within a vehicle 102 according to an exemplary embodiment of the present disclosure. FIG. 6 will be described with reference to the components of FIG. 1 and FIG. 2, though it is to be appreciated that the method 600 of FIG. 6 may be used with additional and/or alternative system components.

The method 600 may begin at block 602, wherein the method 600 may include receiving sensor data associated with an operation of the vehicle 102 or a use of a component of the vehicle 102. The method 600 may proceed to block 604, wherein the method 600 may include storing a first geo-location of the vehicle 102 based on the sensor data. In one embodiment, at least point of interest is determined to be located within a predetermined distance of the first geo-location of the vehicle 102.

The method 600 may proceed to block 606, wherein the method 600 may include determining if a subsequent geo-location of the vehicle 102 is within a predetermined vicinity of the at least one point of interest. The method 600 may proceed to block 608, wherein the method 600 may include providing point of interest related notifications associated with the at least one point of interest when the subsequent geo-location of the vehicle 102 is within the predetermined vicinity of the at least one point of interest.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing point of interest related notifications within a vehicle, comprising:
receiving sensor data associated with an opening of at least one vehicle window of the vehicle;
storing a first geo-location of the vehicle based on the sensor data, wherein storing the first geo-location of the vehicle includes determining if the first geo-location of the vehicle is different from a last stored geo-location of the vehicle, wherein at least one point of interest is determined to be located within a predetermined distance of the first geo-location of the vehicle;
determining if a subsequent geo-location of the vehicle is within a predetermined vicinity of the at least one point of interest; and
providing at least one point of interest related notification associated with the at least one point of interest upon determining that the subsequent geo-location of the vehicle is within the predetermined vicinity of the at least one point of interest.

2. The computer-implemented method of claim 1, wherein storing the first geo-location of the vehicle includes communicating the first geo-location of the vehicle from the vehicle to an external server, wherein a vehicle trip log that is stored on the external server is accessed and a record is created or updated that includes the first geo-location of the vehicle and a time stamp associated with first geo-location of the vehicle.

3. The computer-implemented method of claim 2, wherein the record that includes the first geo-location of the vehicle is updated with at least one point of interest name and at least one point of interest category that is associated with the at least one point of interest that is determined to be located within the predetermined distance of the first geo-location of the vehicle.

4. The computer-implemented method of claim 2, wherein the sensor data is received from at least one window sensor that is disposed near the at least one vehicle window, wherein the at least one window sensor is configured to communicate window sensing data that pertains to a change in an opening or closing status of the at least one window.

5. The computer-implemented method of claim 4, wherein the data pertaining to the opening of the at least one window of the vehicle is utilized as a triggering event that is used to determine at least one instance in which a current geo-location of the vehicle is to be retrieved from the vehicle and stored upon an external server.

6. The computer-implemented method of claim 5, wherein an opening of a window of a particular door of the vehicle is classified as a triggering event that is used to determine at least one instance in which the current geo-location of the vehicle is to be retrieved from the vehicle and stored upon the external server.

7. The computer-implemented method of claim 6, wherein determining if the subsequent geo-location of the vehicle is within the predetermined vicinity of the at least one point of interest includes querying the vehicle trip log to determine if a record exists that includes the first geo-location of the vehicle that is within a predetermined vicinity of the subsequent geo-location of the vehicle, wherein point of interest related data is retrieved that is associated with the at least one point of interest.

8. The computer-implemented method of claim 1, wherein providing the at least one point of interest related notification includes retrieving point of interest related notification data that associated with the at least one point of interest that is located within the predetermined vicinity of the subsequent geo-location of the vehicle and presenting the at least one point of interest related notification through a display unit within the vehicle.

9. A system for providing point of interest related notifications within a vehicle, comprising:
a memory storing instructions when executed by a processor cause the processor to:
receive sensor data associated with an opening of at least one vehicle window of the vehicle;
store a first geo-location of the vehicle based on the sensor data, wherein storing the first geo-location of the vehicle includes determining if the first geo-location of the vehicle is different from a last stored geo-location of the vehicle, wherein at least one point of interest is determined to be located within a predetermined distance of the first geo-location of the vehicle;

determine if a subsequent geo-location of the vehicle is within a predetermined vicinity of the at least one point of interest; and
provide at least one point of interest related notification associated with the at least one point of interest upon determining that the subsequent geo-location of the vehicle is within the predetermined vicinity of the at least one point of interest.

10. The system of claim 9, wherein storing the first geo-location of the vehicle includes communicating the first geo-location of the vehicle from the vehicle to an external server, wherein a vehicle trip log that is stored on the external server is accessed and a record is created or updated that includes the first geo-location of the vehicle and a time stamp associated with first geo-location of the vehicle.

11. The system of claim 10, wherein the record that includes the first geo-location of the vehicle is updated with at least one point of interest name and at least one point of interest category that is associated with the at least one point of interest that is determined to be located within the predetermined distance of the first geo-location of the vehicle.

12. The system of claim 10, wherein the sensor data is received from at least one window sensor that is disposed near the at least one vehicle window, wherein the at least one window sensor is configured to communicate window sensing data that pertains to a change in an opening or closing status of the at least one window.

13. The system of claim 12, wherein the data pertaining to the opening of the at least one window of the vehicle is utilized as a triggering event that is used to determine at least one instance in which a current geo-location of the vehicle is to be retrieved from the vehicle and stored upon an external server.

14. The system of claim 13, wherein an opening of a window of a particular door of the vehicle is classified as a triggering event that is used to determine at least one instance in which the current geo-location of the vehicle is to be retrieved from the vehicle and stored upon the external server.

15. The system of claim 14, wherein determining if the subsequent geo-location of the vehicle is within the predetermined vicinity of the at least one point of interest includes querying the vehicle trip log to determine if a record exists that includes the first geo-location of the vehicle that is within a predetermined vicinity of the subsequent geo-location of the vehicle, wherein point of interest related data is retrieved that is associated with the at least one point of interest.

16. The system of claim 9, wherein providing the at least one point of interest related notification includes retrieving point of interest related notification data that associated with the at least one point of interest that is located within the predetermined vicinity of the subsequent geo-location of the vehicle and presenting the at least one point of interest related notification through a display unit within the vehicle.

17. A non-transitory computer readable storage medium storing instructions that when executed by a computer, which includes a processor perform a method, the method comprising:
receiving sensor data associated with an opening of at least one vehicle window of the vehicle;
storing a first geo-location of the vehicle based on the sensor data, wherein storing the first geo-location of the vehicle includes determining if the first geo-location of the vehicle is different from a last stored geo-location of the vehicle, wherein at least one point of interest is determined to be located within a predetermined distance of the first geo-location of the vehicle;

determining if a subsequent geo-location of the vehicle is within a predetermined vicinity of the at least one point of interest; and providing at least one point of interest related notification associated with the at least one point of interest upon determining that the subsequent geo-location of the vehicle is within the predetermined vicinity of the at least one point of interest.

18. The non-transitory computer readable storage medium of claim 17, wherein providing the at least one point of interest related notification includes retrieving point of interest related notification data that associated with the at least one point of interest that is located within the predetermined vicinity of the subsequent geo-location of the vehicle and presenting the at least one point of interest related notification through a display unit within the vehicle.

* * * * *